(12) United States Patent
Vos et al.

(10) Patent No.: US 9,369,230 B2
(45) Date of Patent: Jun. 14, 2016

(54) METHOD AND APPARATUS FOR BROADCAST CHANNEL DECODING

(71) Applicant: SIERRA WIRELESS, INC., Richmond (CA)

(72) Inventors: Gustav Gerald Vos, Surrey (CA); Steven John Bennett, Coquitlam (CA); Lutz Hans-Joachim Lampe, Vancouver (CA); Ghasem Naddafzadeh Shirazi, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 26 days.

(21) Appl. No.: 14/243,621

(22) Filed: Apr. 2, 2014

(65) Prior Publication Data

US 2014/0301296 A1  Oct. 9, 2014

Related U.S. Application Data

(60) Provisional application No. 61/807,641, filed on Apr. 2, 2013.

(51) Int. Cl.
*H04W 4/00* (2009.01)
*H04L 1/00* (2006.01)
*H04L 5/00* (2006.01)

(52) U.S. Cl.
CPC .............. *H04L 1/00* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 2009/0249027 A1* | 10/2009 | Kim | .................. | H04L 25/03866 |
| | | | | 712/5 |
| 2011/0013730 A1* | 1/2011 | Mansson | .............. | H04B 7/0689 |
| | | | | 375/340 |
| 2011/0026645 A1* | 2/2011 | Luo | ........................ | H04L 1/0038 |
| | | | | 375/340 |
| 2011/0164707 A1* | 7/2011 | Luo et al. | ...................... | 375/341 |

(Continued)

FOREIGN PATENT DOCUMENTS

WO  WO 2010/093028  8/2010
WO  WO 2012/024588  2/2012

OTHER PUBLICATIONS

3GPP TS 36.331 V11.2.0 (Dec. 2012), 3rd Generation Partnership Project; Technical Specification Group Radio Access Network; Evolved Universal Terrestrial Radio Access (E-UTRA); Radio Resource Control (RRC); Protocol specification (Release 11) (340 pages).

(Continued)

*Primary Examiner* — Otis L Thompson, Jr.
(74) *Attorney, Agent, or Firm* — Perkins Coie LLP

(57) ABSTRACT

A method and apparatus for decoding the LTE physical broadcast channel (PBCH). The transmissions are made by an evolved NodeB (eNB). At least one template symbol sequence representative of a potential transmission by the eNB over the PBCH is provided. A signal or signals transmitted over the PBCH by the eNB is received, the signal or signals indicative of a received symbol sequence. Correlation operations are performed for correlating the at least one template symbol sequence against the received symbol sequence. A representative symbol sequence, timing parameter, or both, is selected, based on the correlation operations. The representative symbol sequence is indicative of information transmitted by the eNB over the LTE PBCH. The timing parameter is indicative of timing of said information transmitted by the eNB.

27 Claims, 4 Drawing Sheets

(56) References Cited

U.S. PATENT DOCUMENTS

2011/0292875 A1    12/2011    Luo et al.
2012/0163223 A1*    6/2012    Lo .................... H04L 5/0007 370/252

OTHER PUBLICATIONS

3GPP TS 36.101 V11.3.0 (Dec. 2012), 3rd Generation Partnership Project; Technical Specification Group Radio Access Network; Evolved Universal Terrestrial Radio Access (E-UTRA); User Equipment (UE) radio transmission and reception (Release 11) (392 pages).

3GPP TS 36.211 V11.1.0 (Dec. 2012), 3rd Generation Partnership Project; Technical Specification Group Radio Access Network; Evolved Universal Terrestrial Radio Access (E-UTRA); Physical Channels and Modulation (Release 11) (108 pages).

Sierra Wireless, "PBCH correlation decoder for MTC coverage improvement" 3GPP TSG RAN WG1 #72bis (R1-131043), Chicago, USA, Apr. 15-19, 2013 (5 pages).

ITRI, "Decoding Technique of PBCH for Low-cost MTC Devices", 3GPP TSG RAN WG1 Meeting 73 (R1-132255) Fukuoka, Japan, May 20-24, 2013 (4 pages).

* cited by examiner

METHOD AND APPARATUS FOR BROADCAST CHANNEL DECODING

CROSS-REFERENCE TO RELATED APPLICATIONS

This application claims the benefit and priority of U.S. Provisional Application 61/807,641, filed Apr. 2, 2013. The foregoing application is incorporated by reference herein in its entirety.

FIELD OF THE INVENTION

The present invention pertains in general to wireless communications and in particular to decoding of broadcast channels such as the LTE physical broadcast channel.

BACKGROUND

Wireless communication systems such as LTE systems exhibit limited coverage, particularly for terminals exposed to marginal radio conditions. It is often desired to improve coverage, and typical approaches to coverage improvement include increasing data repetition, decreasing the coding rate, or the like. Currently, there is a focus on providing coverage improvement for machine-to-machine wireless devices, which may have significantly different operating requirements from user devices. For example, machine-to-machine devices such as wireless monitors or meters may only transmit relatively small amounts of data, possibly infrequently, and possibly with high tolerance to latency, system acquisition times, or the like.

The Physical Broadcast Channel (PBCH) used in LTE systems is one communication channel which may benefit from coverage improvement efforts. However, typical approaches to improving coverage for this channel, such as increasing repetition and adjusting coding, would require significant changes to the LTE standard and such changes would likely not be backward compatible and would increase system overhead given the increase in repetition.

Therefore there is a need for a method and apparatus for achieving coverage improvement in broadcast channels such as the PBCH that is not subject to one or more limitations in the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for decoding of broadcast channels such as the LTE PBCH. In accordance with an aspect of the present invention, there is provided a method for decoding transmissions over a physical broadcast channel (PBCH) by a user equipment (UE), said transmissions made by a base station, wherein the PBCH provides timing information and configuration information for supporting communication, the method comprising: providing at least one template symbol sequence representative of a potential transmission by the base station over the PBCH; receiving one or more signals transmitted over the PBCH by the base station, the one or more signals indicative of a received symbol sequence; processing the one or more signals to extract the received symbol sequence; performing correlation operations between the at least one template symbol sequence and the received symbol sequence; and selecting a representative symbol sequence, timing parameter, or both, based on the correlation operations, said representative symbol sequence indicative of information transmitted by the base station over the PBCH.

In accordance with another aspect of the present invention, there is provided a user equipment (UE) apparatus for decoding transmissions over a physical broadcast channel (PBCH), said transmissions made by a base station, wherein the PBCH provides timing information and configuration information for supporting communication, the apparatus comprising: a template module configured to provide at least one template symbol sequence representative of a potential transmission by the base station over the PBCH; a receiver module configured to receive one or more signals transmitted over the PBCH by the base station, the one or more signals indicative of a received symbol sequence, the receiver module further configured to process the one or more signals to extract the received symbol sequence; a correlation module configured to perform correlation operations between the at least one template symbol sequence and the received symbol sequence; and an evaluation module configured to select a representative symbol sequence, timing parameter, or both, based on the correlation operations, said representative symbol sequence indicative of information transmitted by the base station over the PBCH.

In accordance with another aspect of the present invention, there is provided a computer program product comprising a computer readable medium storing computer executable statements and instructions thereon that, when executed by a computer, perform operations for decoding transmissions over a physical broadcast channel (PBCH) by a user equipment (UE), said transmissions made by a base station, wherein the PBCH provides timing information and configuration information for supporting communication, the operations comprising: providing at least one template symbol sequence representative of a potential transmission by the base station over the PBCH; receiving one or more signals transmitted over the PBCH by the base station, the one or more signals indicative of a received symbol sequence; processing the one or more signals to extract the received symbol sequence; performing correlation operations between the at least one template symbol sequence and the received symbol sequence; and selecting a representative symbol sequence, timing parameter, or both, based on the correlation operations, said representative symbol sequence indicative of information transmitted by the base station over the PBCH.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
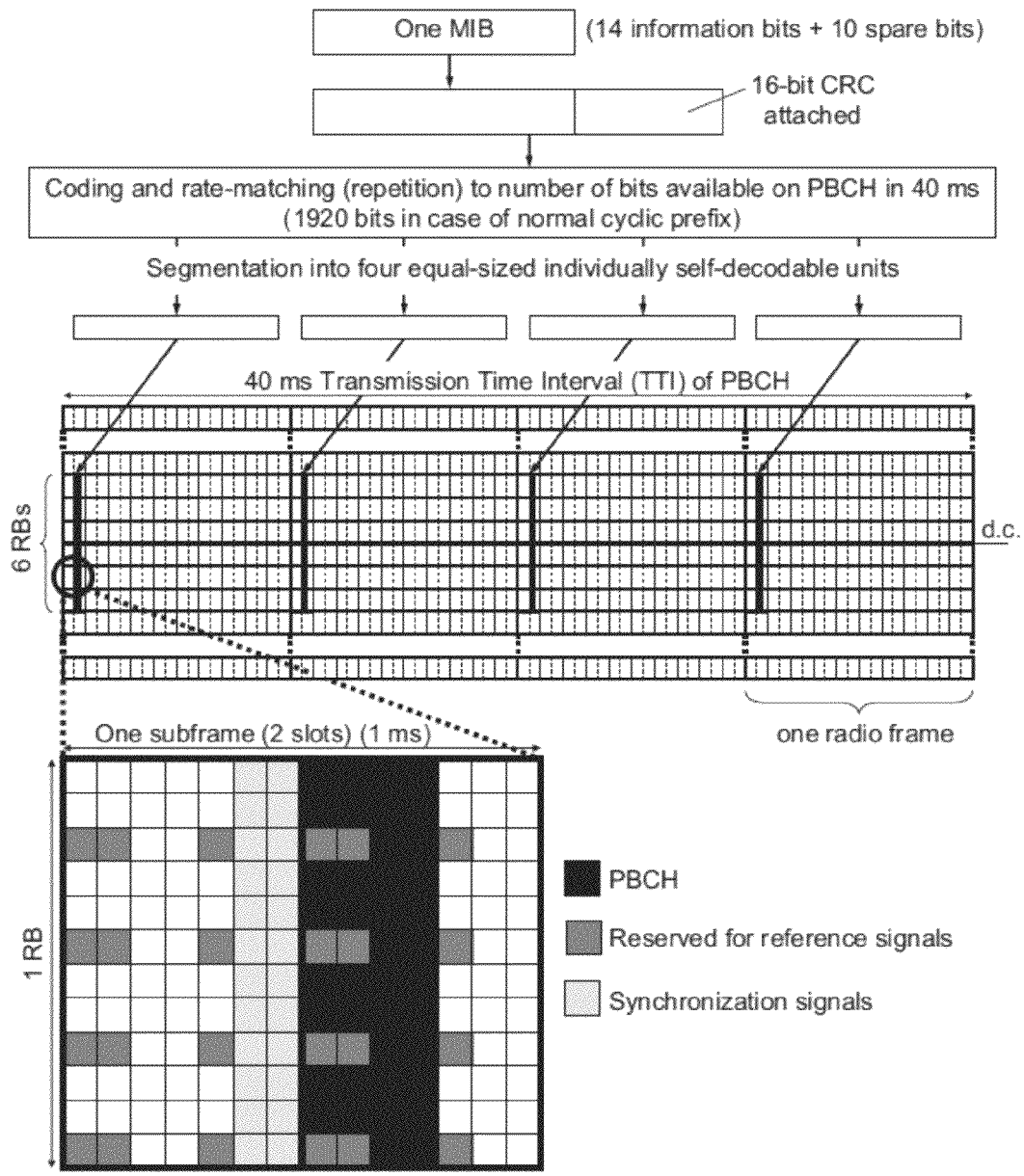
FIG. 1 illustrates aspects of the physical broadcast channel (PBCH) in accordance the prior art.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Aspects of the present invention provide for a correlation PBCH decoder for LTE wireless communication systems. The correlation PBCH decoder may be implemented in a LTE User Equipment (UE) terminal in order to improve coverage of the PBCH channel.

An aspect of the present invention accordingly provides for a method for decoding the LTE physical broadcast channel (PBCH). The transmissions are made by an evolved NodeB (eNB). The method comprises providing at least one template symbol sequence representative of a potential transmission by the eNB over the PBCH. The method further comprises receiving one or more signals transmitted over the PBCH by the eNB, the signals indicative of a received symbol sequence. The method further comprises performing a plurality of correlation operations between the at least one template symbol sequence and the received symbol sequence. The method further comprises selecting a representative symbol sequence, timing parameter, or both, based on the correlation operations, said representative symbol sequence indicative of information transmitted by the eNB over the LTE PBCH, said timing parameter indicative of timing of said information transmitted by the eNB.

The representative symbol sequence may be selected from one of a plurality of template symbol sequences. For example, the representative symbol sequence may be that template symbol sequence which correlates most strongly with the received symbol sequence. The timing parameter may correspond to the time offset which results in the strongest correlation between one of the template symbol sequences and the received symbol sequence.

Another aspect of the present invention accordingly provides for a user equipment (UE) apparatus for decoding transmissions over the LTE physical broadcast channel (PBCH), said transmissions made by an evolved NodeB (eNB). The apparatus comprises a template module configured to provide at least one template symbol sequence representative of a potential transmission by the eNB over the PBCH. The apparatus further comprises a receiver module configured to receive one or more signals transmitted over the PBCH by the eNB, the one or more signals indicative of a received symbol sequence. The receiver module is configured to extract the received symbol sequence from the one or more signals. For example, in one embodiment, the one or more signals may be MIMO signals and extracting the received symbol sequence may comprise combining the MIMO signals. The apparatus further comprises a correlation module configured to perform correlation operations between the at least one template symbol sequence and the received symbol sequence. The apparatus further comprises an evaluation module configured to select a representative symbol sequence, timing parameter, or both, based on the correlation operations, said representative symbol sequence indicative of information transmitted by the eNB over the LTE PBCH, said timing parameter indicative of timing of said information transmitted by the eNB.

More generally, aspects of the present technology may relate to communication standards including but not limited to LTE, wherein the PBCH or equivalent provides timing information and configuration information for supporting communication, and wherein the eNB is more generally referred to as a base station.

Figure 2:
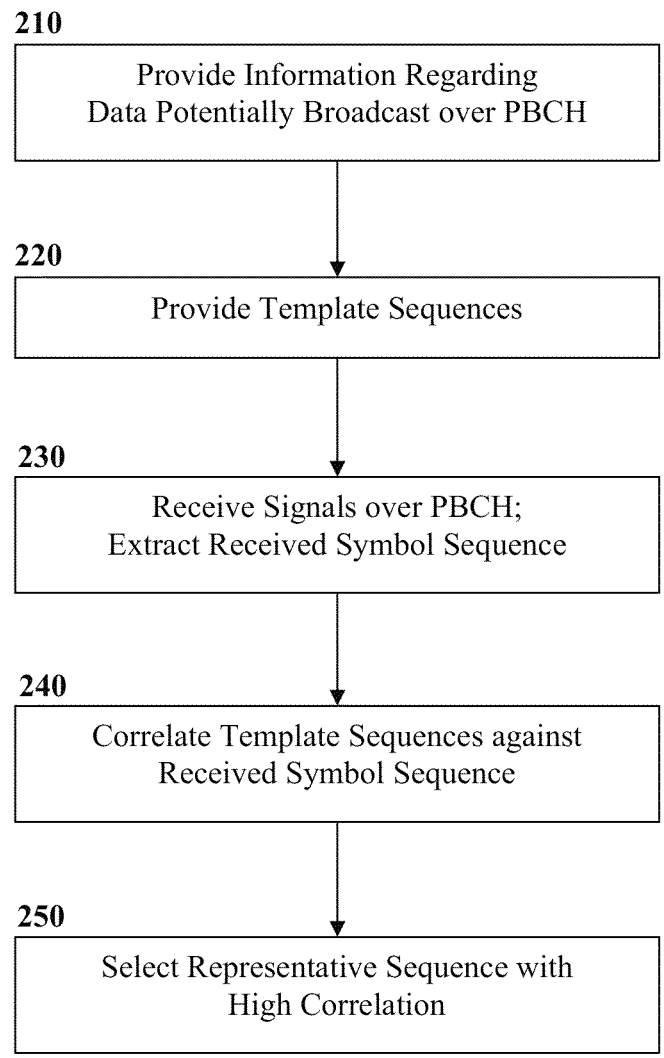
FIG. 2 illustrates a method provided in accordance with embodiments of the invention.

FIG. 2 illustrates a method for decoding the LTE physical broadcast channel (PBCH) in accordance with embodiments of the present invention. The method comprises providing 210 information regarding data to be potentially broadcast by the eNB via the PBCH. Providing the information may comprise generating the information based on information stored in memory, information acquired via monitoring of the wireless environment, or the like. Such data may relate to fields of the Master Information Block (MIB) transmitted via the PBCH, as described below. The provided information may be probabilistic in nature. That is, the provided information need not represent what is to be broadcast with 100% certainty, but rather the provided information may represent one or more "guesses" of what might potentially be broadcast. Each of these guesses may or may not be quantified by a numerical probability. In some embodiments, the provided information 210 may comprise one or more fields of the Master Information Block (MIB), such as the System Frame Number (SFN) field, Downlink Bandwidth (DL-BW) field, Physical Hybrid Automatic Repeat Request (ARQ) Indicator Configuration (PHICH-Config) field, spare bits, Cyclic Redundancy Check (CRC), or the full SFN, or the like, or a combination thereof. The full SFN may include the 8 most significant bits of the SFN as indicated in the SFN field plus the two least significant bits, for example the 10 ms phase within the 40 ms PBCH message. The two least significant bits may be deduced and provided.

The method further comprises providing 220 one or more template sequences based on the provided information 210. Each template sequence may comprise symbols, such as QPSK symbols. Each template sequence represents a set of symbols to be potentially matched against data received via the PBCH. For example, each template sequence may represent a guess of a set of contiguous or non-contiguous symbols to be transmitted by the eNB via the PBCH, for example including the MIB. In some embodiments, the template sequences are generated from the provided information 210 by mimicking the modulation and coding process typically performed by the eNB.

The method further comprises receiving 230, at the UE, one or a plurality of signals transmitted by the eNB via the PBCH. A plurality of signals may be sent, for example, in the case of MIMO implementations, where plural data streams are transmitted by the eNB. The signals may comprise sequences of symbols, such as QPSK symbols, transmitted by the eNB. The signals may comprise information encoded therein, such as the MIB. A received symbol sequence may then be extracted from the received signals.

The method further comprises correlating 240 at least one of the provided one or more template sequences against at least a portion of the signals received 230 from the eNB, for example the extracted received symbol sequence. Correlation may be performed on a single contiguous portion of the received signals 230, or on a plurality of non-contiguous portions of the received signals. Correlation may be performed in the time domain, in the frequency domain, or the like, or a combination thereof. In various embodiments, correlation may conceptually comprise evaluating the following cross-correlation expression:

$$(f * g)[n] \stackrel{def}{=} \sum_{m=-\infty}^{\infty} f^*[m] g[n+m].$$

Here, g represents a given template sequence, f represents a symbol sequence extracted from at least a portion of the received signals, f* represents the complex conjugate of f, and n represents a given time shift. The correlation may be evaluated for a plurality of values of n. Each value of n may be a timing parameter.

In some embodiments, the interval between successive values of n may correspond to successive shifts in the template sequence g of about 10 ms. For a single value of n, the output of a correlation operation is indicative of similarity between a time-shifted version of the template sequence and the received symbol sequence. For a plurality of values of n, the output of a correlation operation is indicative of similarity between the template sequence and the received symbol sequence as a function of various time shifts. For example, if the correlations are performed in a known time relative to the received symbol sequence, after several samples have been correlated a peak in the correlations can be identified, the position of the peak in the correlations relative to the received symbol sequence uniquely locates it in time. However for this example the determined time has an accuracy having a 10 ms resolution, based on the length of time between the successive time shifts in the template sequence.

The method further comprises selecting 250 a representative template sequence, a time shift value, or both, based on the outcomes of the correlation operations performed 240. For example, the correlation operation which outputs the highest value or values, or the correlation operation or operations which output values above a predetermined threshold, or correlation operations which output values significantly above other correlation values may be identified, and the corresponding input template sequences and time shift values may be declared as being the best representative or representatives of the received signals 230. In one embodiment, if the difference between the highest correlation output value and the next highest correlation output value exceeds a predetermined threshold, a detection event may be declared. In various embodiments, a detection event may be conditionally declared and indicative that one of the template sequences and/or associated time shift is adequately correlated with the received symbol sequence that a representative sequence is defined with adequate certainty. Therefore, in various embodiments, correlation operations may facilitate determining one or both of: timing of data broadcast by the eNB; and content of data broadcast by the eNB. The timing and content may relate at least in part to the MIB broadcast by the eNB on the PBCH.

In some embodiments, template sequences are provided adaptively. For example, based on the outcome of one or more correlations, further template sequences may be provided and subjected to further correlations. This cycle may repeat until a template sequence is found which is deemed to be sufficiently likely to represent the received data.

Figure 3:
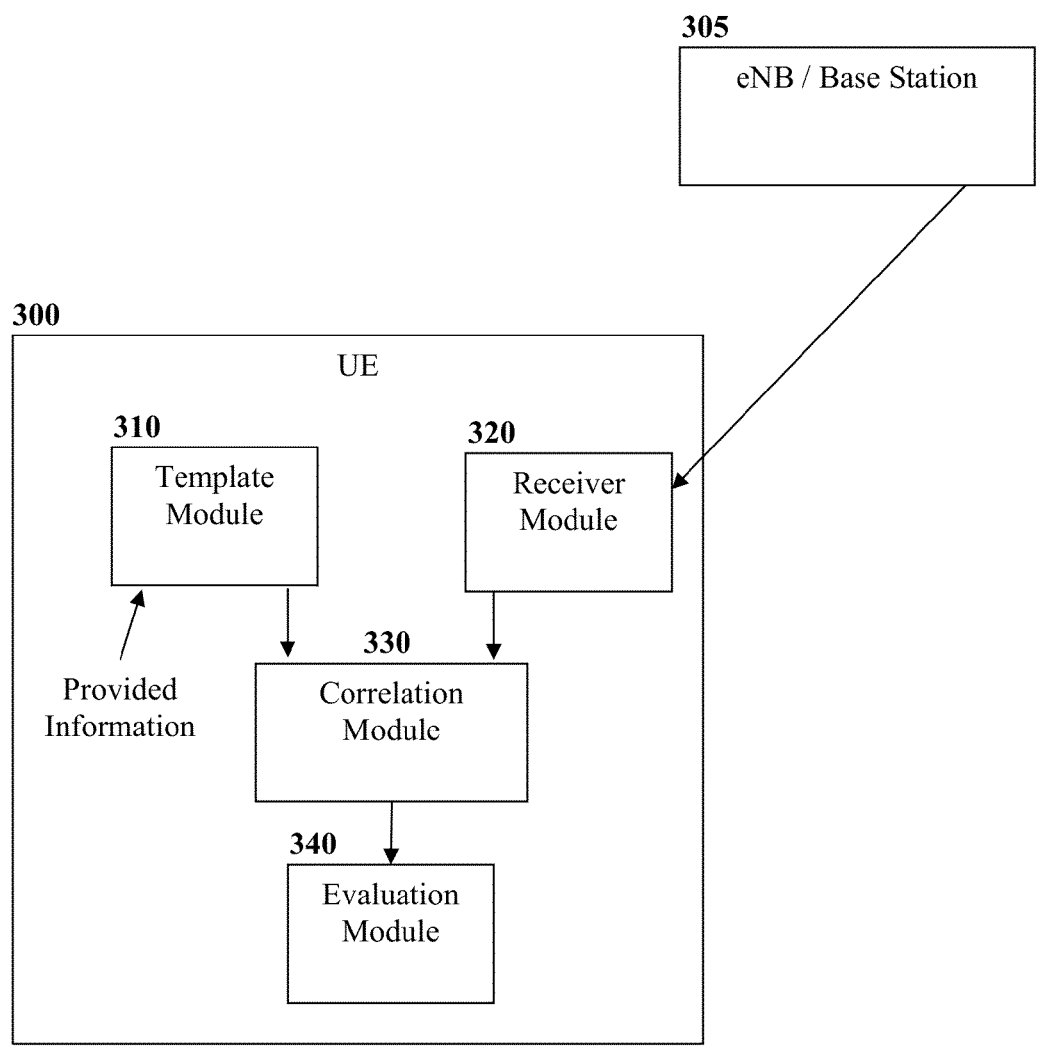
FIG. 3 illustrates an apparatus provided in accordance with embodiments of the invention.

FIG. 3 illustrates a UE 300, such as a mobile device, wireless communication device, M2M device, or the like, configured in accordance with embodiments of the present invention. The UE comprises a template module 310 configured to provide at least one template symbol sequence representative of a potential transmission by the eNB over the PBCH. The UE further comprises a wireless receiver module 320 configured to receive and process radio signals from a eNB 305 in accordance with a version of the LTE protocol. The receiver module 320 is configured in part to receive one or more signals transmitted over the PBCH by the eNB, the signals indicative of a received symbol sequence. The UE further comprises a correlation module 330 configured to perform a plurality of correlation operations between the at least one template symbol sequence and the received symbol sequence. The UE further comprises an evaluation module 340 configured to select a representative symbol sequence, timing parameter, or both, based on the plurality of correlation operations, said representative symbol sequence indicative of information transmitted by the eNB over the PBCH, said timing parameter indicative of timing of said information transmitted by the eNB.

The template module 310 may further be configured to provide information related to data potentially encoded into the potential transmission. The information may be retrieved from memory, determined from observation of wireless signals, configuration settings, out-of-band information, or the like. Each of the at least one template symbol sequences may then be generated based at least in part on said provided information.

The UE 300 may comprise various computing hardware, software, firmware, or a combination thereof, in order to facilitate the operations as described herein. In various embodiments, the UE comprises a microprocessor operatively coupled to memory, such as RAM, ROM, or the like, the memory storing program instructions for execution by the microprocessor in order to execute various computing operations as described herein. The UE may comprise dedicated digital signal processing hardware or other hardware for performing computations such as correlation operations, Fast Fourier Transform (FFT) operations, value comparison operations, generation of template sequences, and the like, in furtherance of the present invention. Various modules of the UE 300 may be implemented using the computing hardware, software and/or firmware thereof. Thus, for example, the template module, correlation module, and evaluation module may comprise components such as the microprocessor, memory, digital signal processor, Application Specific Integrated Circuit (ASIC), or the like. The receiver module may comprise RF communication hardware components and signal processing hardware components.

In various embodiments, operation of an eNB, which is in communication with the UE operating the correlation PBCH decoder, may also be adjusted in order to facilitate operation of the present invention. However, in some embodiments, adjustments to operation of the eNB are relatively minor. This may be advantageous in allowing for improved deployment of the technology as well as maintaining backward compatibility with legacy UEs.

Similarly, in some embodiments, the present technology may be implemented with only minor changes to the LTE standard required. In various embodiments, the present technology may be implemented substantially without changes to the existing PBCH.

In some embodiments, the signal or signals indicative of the received symbol sequence is collected and stored in memory, for example by a signal collection and storage module. The signals may be collected during PSS/SSS (primary synchronization signals/secondary synchronization signals) decoding using a buffer, such as the HARQ buffer, for example.

Figure 4:
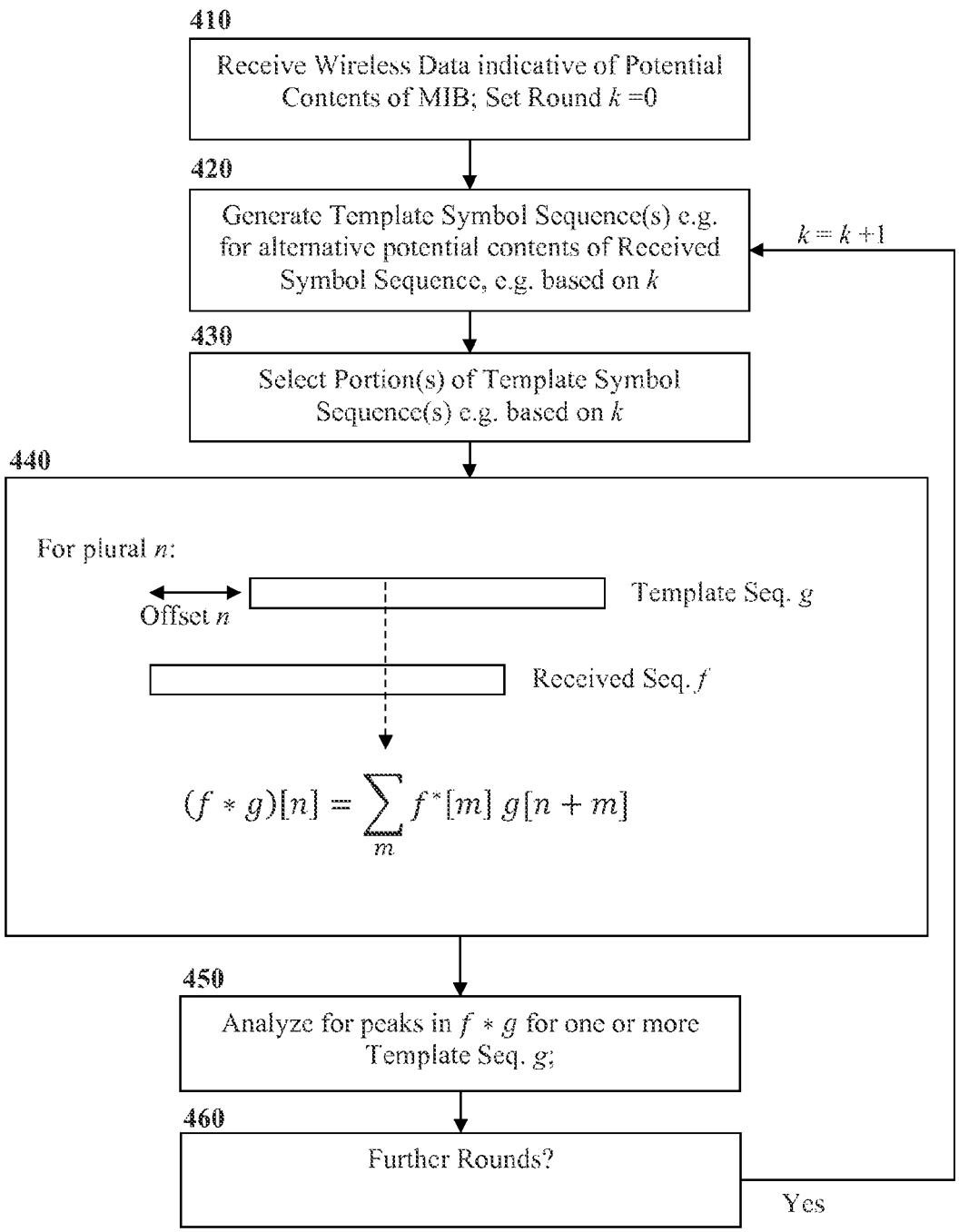
FIG. 4 illustrates various operations related to and including correlation carried out in accordance with embodiments of the invention.

FIG. 4 illustrates operations related to and including correlation carried out in accordance with embodiments of the invention and presented by way of non-limiting example and for further illustration. The operations in this example relate to correlation-based decoding of a received MIB symbol sequence. Initially, wireless data indicative of potential contents of the MIB are received 410. This may include data conveyed via SIB1 for example. If multiple rounds of correlation operations are to be performed, a counter k is initialized. Next, template symbol sequences are generated 420, with each template sequence being generated so as to match with a potential version of the received MIB, based on the potential contents thereof. In some embodiments, the template symbol sequences are further generated based on the current value of the counter k. For example, the number and/or selection of template sequences used may vary between rounds, for example in accordance with an adaptive search. Next, portions of the template sequences are selected 430 for use in the correlation operation. A portion may correspond to all of a template sequence or to a contiguous or non-contiguous part thereof. In some embodiments, the portions are also further selected based on the current value of the counter k.

Next, correlation operations are performed 440 between the template sequences and the received MIB. Specifically, the cross-correlation expression referred to above is used to evaluate, for a plurality of time offset values n and potentially for a plurality of template sequences g, the cross-correlation values $(f*g)[n]$, wherein in this example, f represents the received MIB symbol sequence.

Subsequently, the results of the cross correlation values are analyzed 450, for example to discern peaks in the function(s) $(f*g)[n]$ for one or more template sequences g. Significant peaks may correspond to timing parameters of the wireless communication system and/or assumed correct decoding of the received MIB, and may be interpreted as such for use by the UE. Otherwise, if further rounds of correlation operations are required 460, then the counter k may be incremented and the operations repeated from template generation 420 onward.

Physical Broadcast Channel

The LTE PBCH periodically broadcasts a Master Information Block (MIB) comprising 14 bits plus 10 spare bits, which includes a limited number of parameters which are used in LTE system access. The parameters include a downlink system bandwidth parameter (e.g. indicative of the number of resource blocks in the downlink), a physical hybrid Automatic Repeat Request (ARQ) (PHICH) indicator parameter (e.g. PHICH-Config), and the eight most significant bits of the System Frame Number (SFN). Various details of the LTE PBCH may be found in the various 3GPP technical documents, for example "3GPP TS 36.331 V11.2.0 (2012-12), 3rd Generation Partnership Project; Technical Specification Group Radio Access Network; Evolved Universal Terrestrial Radio Access (E-UTRA); Radio Resource Control (RRC); Protocol specification (Release 11)," referred to herein as TS 36.331, "3GPP TS 36.101 V11.3.0 (2012-12), 3rd Generation Partnership Project; Technical Specification Group Radio Access Network; Evolved Universal Terrestrial Radio Access (E-UTRA); User Equipment (UE) radio transmission and reception (Release 11)," referred to herein as TS 36.101, and "3GPP TS 36.211 V11.1.0 (2012-12), 3rd Generation Partnership Project; Technical Specification Group Radio Access Network; Evolved Universal Terrestrial Radio Access (E-UTRA); Physical Channels and Modulation (Release 11)," referred to herein as TS 36.211.

As indicated in TS 36.211, in at least Section 6.6.1, the two least significant bits of the SFN are acquired implicitly in the PBCH decoding. For example, a timing of 40 ms PBCH TTI may indicate two least significant bits (within 40 ms PBCH TTI, the first radio frame: 00, the second radio frame: 01, the third radio frame: 10, the last radio frame: 11). One value may apply for all serving cells (the associated functionality is common i.e. not performed independently for each cell).

In various embodiments, some parameters of the MIB, such as the PHICH-Config parameter, may be constrained at the eNB so as to remain unchanged as much as possible or to change infrequently. Retaining static or quasi-static MIB parameters, or otherwise constraining the parameters to be relatively predictable, may facilitate operation of the present technology, particularly with respect to correlation operations.

Also broadcast by the eNB is a series of System Information Blocks (SIB), such as the Type-1 SIB (SIB1) and the Type-2 SIB (SIB2). According to the LTE standard, SIBs are transmitted on the channel identified as Broadcast Control Channel (BCCH); Downlink Shared Channel (DL-SCH); Physical Downlink Shared Channel (PDSCH). The SIBs are scheduled on the Physical Downlink Control Channel (PDCCH), similarly to all other PDSCH traffic. In current implementations of LTE, for a UE to access the eNB, the UE requires knowledge of at least SIB1 and SIB2.

In current LTE implementations, SIB1 is broadcast using a fixed schedule with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0. No Si windowing is used. Si windowing is defined in the LTE specification, for example in TS 36.331, Section 6.2.2. SIB1 may be scheduled anywhere within the UE's common PDCCH search space.

In current LTE implementations, the redundancy version is determined by $RV_K$=ceiling $(3/2*k)$ modulo 4, where k=(SFN/2) modulo 4, and SFN is the system frame number.

For different eNB antenna configurations, the reference symbols are transmitted at different resource elements within a subframe. TS 36.211, section 6.10.1.2 provides further information on mapping of reference symbols to resource elements. The generation of cell-specific reference symbols can depend on knowledge of the cell ID, which in turn is obtained when the UE decodes the PSS/SSS channels.

The above information on the physical broadcast channel reflects the current state of the art as specified by the LTE standard. It will be readily understood that, as the LTE standard evolves, the state of the art may change. Embodiments of the present technology may be adapted to compensate for current or future variations in the LTE standard, at least some such adaptations being readily understandable by a worker skilled in the art.

For example, the current LTE standard specifies that the 10 spare bits of the MIB be set to zero. However, should this change in the future, embodiments of the present invention may be adapted accordingly, for example as described elsewhere herein. Furthermore, embodiments of the present invention may include means for adapting to updates in the LTE standard, for example by communicating spare bit settings from the base station to the UE, and adapting operation of the UE so that template symbol sequences are generated with the spare bit settings as specified by the current standard.

Correlation Against Broadcast Stream

From the above-described features of the PBCH and the MIB broadcast over the PBCH, the following features are notable with respect to the present invention. Only the SFN (System Frame Number) is incremented by 1 each frame. Since the SFN field within the MIB contains the 8 most significant bits of the SFN, this field is incremented by 1 every four radio frames (40 ms). Thus the SFN field within the MIB may be incremented every PBC period, for example. Knowing the SFN within one frame therefore allows the SFN to be predicted for subsequent frames. With a high likelihood, no other parameters within the MIB change regularly from frame to frame, although such parameters may change infrequently. The frames repeat periodically, in various embodiments repetition being every 10.24 sec. There is relatively little data to be decoded by the UE beyond the SFN (~8 bits) within the MIB. Embodiments of the present technology therefore utilize the relative sparseness of information within the MIB to facilitate coverage improvement for the PBCH.

Embodiments of the present invention may be understood based at least in part on the following observations. Assume a UE possesses all information within the broadcast MIB except for the SFN. In this case it has been observed that the decoding problem reduces to a problem in determining the system timing. It has been further observed that similar decoding problems are encountered in various Code Division Multiple Access (CDMA) systems. The coded PBCH frames are then considered, from a design viewpoint, as a known pseudo randomized symbol stream which repeats periodically, for example every 10.24 seconds. Again it has been observed that such a symbol stream resembles a CDMA pseudorandom (PN) sequence.

In view of the above, embodiments of the present invention comprise the UE performing a correlation against a data stream transmitted from the eNB via the PBCH. The correlation is performed in order to determine the system timing, by temporally orienting the UE within the data stream, for example by synchronizing the UE with a running count of the current System Frame Number (SFN) of the LTE wireless communication system.

Since the UE does not know all the information in the MIB, in some embodiments, the UE is configured to perform the correlation against multiple sequences corresponding to all the possible information bits within the MIB. Normally such relatively exhaustive approaches are computationally expensive. However, since the number of possible sequences is relatively small and the correlation only needs to be performed on a frame basis (i.e., every 10 ms and not on a symbol basis), the computational costs are feasible. For example, it is estimated that only about 200 MIPS are required for 14 dB of coverage gain.

In some embodiments, the correlation performed by the UE comprises the following. The UE generates an estimate of information that is expected to be broadcast on the PBCH, including information regarding the various parameters of the broadcast MIB. The UE then generates a template symbol sequence based on the generated estimates. The template symbol sequence as used herein may also be regarded as a candidate symbol sequence. The template symbol sequence represents and/or matches the UE's estimate of what is to be broadcast in a predetermined portion of the PBCH, said predetermined portion including the next broadcast of the MIB, for example. The eNB then broadcasts on the PBCH and the UE receives at least the portion of the broadcast which corresponds to its estimate. That is, the UE receives the actual symbol sequence for which it has generated its template symbol sequence estimate. The UE then performs a plurality of correlation operations, each of which correlates the template symbol sequence against the received actual symbol sequence, subjected to a different time shift. Each correlation operation may be configured to determine the degree to which the template symbol sequences are orthogonal or non-orthogonal to the received actual symbol sequence, for example. A higher correlation may be assigned to template symbol sequences which are relatively less orthogonal to the received actual symbol sequence. Various computational approaches for performing correlation may be used as would be readily understood by a worker skilled in the art.

In some embodiments, if some information to be conveyed by the received symbol sequence is known, for example retrieved from memory or inferred from other information, for example observation of radio signal characteristics, or the like, then this information can be used to reduce the number of unknown parameters covered by template symbol sequences. This in turn may be used to reduce the set of template symbol sequences under consideration. For example parameters such as CRC (cyclic redundancy code) and RF-BW (radio frequency bandwidth) may be inferred or estimated as described elsewhere herein.

In some embodiments, the correlation performed by the UE comprises the following. In a first step, substantially all possible PBCH blocks are encoded in order to obtain the symbol sequences for all values of the following MIB parameters: PHICH-config (3 bits); DL-BW (3 bits); and CRC type (3 types). Since only some DL-BW configurations are valid, this will yield a limited number of template sequences each with a predetermined number of symbols. For example, currently about six DL-BW configurations are valid (the number of Downlink Resource Blocks (DL RBs) can be either 6 (000), 15 (001), 25 (010), 50 (011), 75 (100), or 100 (101), and this will yield 144 template sequences with 245760 QPSK symbols in each.

In a second step, depending on the coverage gain required and detection time required, the UE is configured to select one or more parts of the above sequences to correlate against. More or fewer parts of the sequence may be selected for correlation, depending on performance requirements. Thus, portions of each of the 144 template sequences may be selected and these portions may be subject to correlation operations, rather than subjecting each template sequence to correlation operations in its entirety. This may result in reduced computational costs, possibly at the cost of increased detection time. In some embodiments, a fixed-duration portion (for example a 640 ms portion) of each template sequence is selected and subjected to correlation.

In a third step, after the UE has collected enough received PBCH samples, the UE correlates the received symbols against the above chosen template sequences with a sliding shift of 10 ms per correlation. If the correlation of any of the above sequences exceeds a predetermined threshold value, then the corresponding MIB parameters (e.g. SFN, DL-BW, PHICH-config, and CRC type) associated with that highly-correlated sequence are used to continue with the UE's initial acquisition process. The initial acquisition process may comprise attempting to decode the SIBs, for example.

In various embodiments, correlation decoding as described above exhibits satisfactory performance particularly when data conveyed in the MIB, such as the spare bits, PHICH-config, DL-BW, and CRC type, remain substantially unchanged during the correlation process. In current deployments of LTE, this is often the case. However, it may be desirable to adjust the LTE standard in order to specify that the data is to change as little as possible and/or at predictable times. The standard may further be adjusted to specify that changes to the data are to only occur at certain parts of the SFN sequence where the correlation would not be performed by the UE. For example, in some embodiments data changes may be allowed substantially only when 8 bits of the SFN count that are conveyed in the MIB resets from 255 to 0. In such embodiments the maximum change rate of the MIBs is reduced to less than or equal to once every 10.24 seconds.

Controlling for False Positives

In various embodiments, although a strong correlation between a template symbol sequence and a received symbol sequence is indicative of a match, strong correlations may also occur between certain symbol sequences when there is not a match. That is, there is a limited probability of falsely concluding that a template symbol sequence matches the received symbol sequence when in reality it does not. The frequency of false positives may be reduced by setting a higher threshold value at which a correlation is declared to be a match. However, such a higher threshold may also reduce detection sensitivity in noisier environments, in which case actual matches may be missed.

In some embodiments, to further reduce false positives, a template symbol sequence identified as a potential representative symbol sequence may be combined with the actual received symbol sequence. Identification of a template symbol sequence as a potential representative symbol sequence may result from correlation operations performed on the template symbol sequence exceeding a predetermined threshold, for example. This combination of symbols is then passed through the normal PBCH decoding process (e.g. Viterbi decoding) where the output of the decoder may then be analyzed to determine if the CRC check passes, wherein a pass is indicative that the identified template symbol sequence is an adequate representative symbol sequence. By adjusting the ratio of template symbols to received symbols in the combination, more or less decoding gain may be achieved. In some embodiments, this approach may be combined with measures for controlling the rate of false positives which may arise from the combination. For example, the ratio of template symbols to received symbols and hence the resulting gain may be limited to a predetermined amount.

In various embodiments, potential representative sequences may be subject to further analysis, such as further correlation operations, before being declared the best representative sequence. Multiple stages of evaluation may be performed, with each stage being progressively more computationally involved but operating on fewer template sequences.

In some embodiments, a relative threshold approach may be used for detecting the best correlation. For example, rather than declaring a match (e.g. a template sequence which represents the received sequence) when the correlation between a template symbol sequence and the actual symbol sequence exceeds a predetermined threshold, the UE may correlate some or all of the template symbol sequences against the actual symbol sequence, and then declare that template symbol sequences having the relatively highest correlations are the most likely candidates for a match. As another example, the UE may correlate some or all of the template symbol sequences against the actual received symbol sequence, and then declare a match for the sequence with the highest correlation depending on the correlation outputs for the symbol sequences having the next highest correlations, i.e., the sequences that are the next most likely candidates for a match. In some embodiments, a match is declared only if the symbol sequence having the highest correlation is associated with a correlation value that is at least a predetermined threshold amount greater than the correlation score of the symbol sequence having the next-highest correlation score.

Controlling Computational Cost

Performing a large number of computations such as described above may result in a high computational cost, for example in terms of memory usage, millions of instructions per second (MIPS), and the like. In various embodiments, one or more measures may be implemented to control such computational costs.

In some embodiments, computational costs may be controlled by adjusting the number of template symbol sequences. Reducing the number of template sequences may reduce the computational costs. This may be achieved in some embodiments by using known or guessed values for some of the contents of the MIB. In particular, some of the relatively unchanging bits may be determined or guessed. In some embodiments, these values may be inferred from information achieved through other means. For example, the RF bandwidth may be inferred by measuring RF power in the appropriate radio spectrum, for example by observing DL pilots, and such information may be used to infer the value of the MIB DL-BW parameter. As another example, parameters such as DL-BW may be stored in the UE's SIM along with the frequency. As yet another example, since very few antenna configurations are actually deployed in practice, parameters corresponding to more common antenna configurations may be tried before parameters corresponding to less common antenna configurations, wherein antenna configurations can relate to possible CRC type.

In some embodiments, computational costs may be controlled by inferring the eNB antenna configuration using reference symbols, and using this information in turn to reduce the number of template sequences by anticipating content thereof. The UE may decode the primary and secondary synchronization signals (PSS/SSS), and from said decoding the UE obtains information regarding where the RS (reference symbols) are likely to be located, since it has acquired subframe timing. In addition, the UE obtains information regarding the appropriate values of the RS, since it has acquired the cell ID used to generate the cell specific RS. The number of RS sent and their locations are different for different Antenna Configurations (see section 6.10.1.2 "Mapping to resource elements" in TS 36.211). The UE may then be configured to detect which RS are being sent by the eNB and thus the corresponding antenna configuration. This information may be used to infer information such as information transmitted in the MIB related to the eNB antenna configuration, and the template sequences used may be those which contain this inferred information. Correlation or other techniques may be used for detecting whether a known sequence is sent with a data stream. In some embodiments, given there are typically three possible antenna configurations, the UE's MIPS requirements would reduce by a factor of three if the UE determines the antenna configurations by detecting which sets of cell specific RS the eNB is sending.

In some embodiments, computational costs may be controlled by controlling the length of template symbol sequences. Reducing the length of template sequences may reduce the computational costs. The length of the sequences may be reduced so that they are only as long as is required to achieve a predetermined level of gain. For example, to achieve 12 dB of gain, the approximate sequence length may be set to 16 MIBs (10 log(16)=12 dB), which corresponds to 16*40 ms=640 ms or 16*960=15360 QPSK symbols.

For current LTE implementations, the detection time for such reduced-length sequences may be up to 10.24 s. In some embodiments, therefore, the detection time may be reduced by using more than one of the shorter sequences. For example, two 640 ms long sequences may be used, with one at the beginning of the 10.24 sec sequence and one in the middle of the 10.24 sec sequence. In this case, the detection time may be reduced by factor of two to a maximum of 5.12 sec.

In some embodiments, computational costs may be controlled by the selection of an appropriate convolution computation scheme. For example, a fast convolution scheme based on the Fast Fourier Transform (FFT) may reduce computational costs. In various embodiments, the correlation of the received symbol sequence with the template sequences can be described as a cyclic convolution. Various methods may be employed to reduce the number of operations needed for convolution. For example, for the cyclic convolution of two sequences of length N, the number of multiplication and addition operations can be reduced from about N*N for the direct method to about 3*N*log 2(N) operations using the FFT.

In some embodiments, fast convolution at the correlation receiver may be implemented as follows. A number K of received samples are placed in a vector, which is zero padded to N=245760 symbols (the full length sequence). The FFT of this vector is multiplied with the FFT of the template sequences, wherein the template sequences may be pre-computed. The inverse FFT of the product is then taken, which gives the correlation result. The number of operations for this is about (N+3*N*log 2(N)) or (N+2*N*log 2(N)), where the latter figure assumes pre-computation of the FFT of the template sequences. Memory requirements for the pre-calculated FFT sequences can be high unless some of the PBCH values (e.g. BW, PCHICH-Config) are known. Since only every 960th correlation results is needed (assuming a time shift by 10 ms for subsequent correlation operations) and considering the zero-padding of the received sequence, the number of operations may be reduced to N*[1+log 2(N)+log 2(L)+log 2(K)], where L=N/960=256, In some embodiments, FFT/IFFT hardware accelerator blocks in the baseband modem chip, which may be pre-existing and also used for applications such as OFMDA modulation/demodulation, can be re-used for correlation purposes. Such a re-use of existing hardware may significantly reduce DSP MIPS requirements, lowering power consumption, and potentially reducing additional hardware costs.

In some embodiments, computational costs may be controlled by varying the number of template sequences for which correlations are performed. For example, instead of performing correlation with all template sequences, only a limited number of promising template sequences can be pursued, thereby reducing computational costs. In some embodiments, correlation may proceed adaptively, with selection of template sequences for correlation proceeding based on results from correlations performed on previous template sequences, actual sequences, or both.

For example, initially, the correlation values are obtained for a short correlation (e.g., 2*40 ms) which may indicate that a certain subset of template sequences have notably higher correlation and are thus more likely to be adequate representative symbol sequences. Then, using additional received samples and a longer correlation, only sequences from this set are considered further. One or more strategies may be applied to reduce the search space, for example categorized as depth-first, breadth-first, and best-first search methods. Such methods may be employed similarly to their use in other applications, for example, sequential decoding of convolutional codes.

In some embodiments, the processing requirements and/or the speed for re-acquisition of the PBCH may be reduced by using previously acquired PBCH parameters (e.g. BW, PHICH config, and CRC type) by the correlation decoder at re-acquisition. Re-acquisition may occur for example when the UE has performed initial acquisition but then powers off for a time and powers back on in a similar location.

In some embodiments, hard decisions on the received symbol stream may be made to convert the symbols into bits. Subsequently, correlation may be performed via an XOR operation with the template sequences instead of a multiply-accumulate operation. If a digital signal processor (DSP) having 32-bit long registers is employed, this approach may reduce the MIPS by up to 32 times, although this savings may be reduced somewhat due to requirements for accumulating the "ones" after the XOR operation. If this accumulation of "ones" is performed via a large lookup table the MIPS may be reduced for example by up to about 32/4=8 times. Furthermore, although this method may negatively impact the probability of detection, since less MIPS are used the correlation length may be increased to compensate.

In various embodiments, symbol sequences may be encoded as bit sequences and the correlation operations performed on the bit sequences. Bit sequences may represent bits which the symbol sequences are known to encode or estimated to likely encode. Bit sequences may alternatively be representative of a digitized, sampled version of an analog waveform. Bit sequences may represent the symbol sequence in a variety of other ways, as would be readily understood by a worker skilled in the art. In some embodiments, symbol sequences may be mapped to values in the binary set $\{-1,1\}$ and correlations performed subsequent to mapping. In some embodiments, bit sequences are the default subject of the correlation operations.

Decoding SIB1 Before MIB

In some embodiments, the SIB1 may be decoded before the MIB. This may be performed via a two-step process as described below. First, the UE decodes the common search space of the PDCCH on subframe #5 every 10 ms, rather than every 20 ms. The UE is configured to monitor for the particular signature of SIB1 DCI assignments messages (with SI-RNTI=0xFFFF). Second, when a SIB1 DCI assignment message is detected, the UE is configured to decode the SIB1 PDSCH using all four possible values of the redundancy version (RV). It is noted that the UE may need the RF-BW to understand the RB allocation field. Normally the RV is derived from the SFN (system frame number).

When the SIB1 DCI message is decoded in the first step, it can be concluded by the UE that SFN mod 2=0. In this case, the UE may stop at the first step and use this information to reduce the number of correlations, and hence reduce the computational cost, by a factor of two.

When the SIB1 message on the PDSCH is decoded in the second step, it can be concluded by the UE that the phase of the SFN mod 8=0. In this case, the UE may use this SFN phase information to reduce the number of correlations, and hence reduce the computational cost, by a factor of 8. It is noted that, in some embodiments, the above-described second step is only possible if the UE knows a priori either the DL-Bandwidth (normally given by the MIB) or the location of the allocated RB's corresponding to the SIB1 message (normally given in the DCI message).

In some embodiments, decoding SIB1 before the MIB has the added benefit of knowing the PLMN ID (contained within SIB1) earlier so that the UE can evaluate if this is the most preferred system (e.g. a home vs. roaming system) quicker.

In some embodiments, the peak MIPS requirements (and thus UE costs) do not increase using this method. For the first step, the UE normally has to decode the PDCCH common search space in time to decode the corresponding PDSCH in the same subframe (<1 ms) so this will typically complete before the next PDCCH decode has to be done in 10 ms. For the second step, the UE may be required to decode the PDSCH four ways. This is similar to decoding four different PDSCH assignments in one subframe, where the UE would have to have the processing power to complete this process before the next subframe (1 ms). However, the absolute amount of processing may increase which would increase power consumption when the UE is in the system acquisition state.

Further Performance Improvement

In various embodiments, an analysis of the partial sequences used to reduce computational costs may indicate that taking particular contiguous or non-contiguous groups of symbols, or even apparently random collections of symbols potentially yields better correlation properties and therefore a better probability of correct detection and lower false detection probability. However using non-contiguous groups of symbols may also require a longer processing time than for the same number of contiguous symbols.

In various embodiments, since there are several spare bits (for example 10 spare bits) within the PBCH and/or MIB, these spare bits and the bits that represent the current parameters (e.g. BW, PHICH-Config, SFN, CRC Type) may be re-ordered and chosen to yield high correlation properties. However, this approach is not backward compatible with the current LTE standard. In some embodiments, the spare bits of the MIB, nominally all zero, may be assigned other values such as to produce sequences with good correlation properties. This approach would be backward compatible.

For the above, it is noted that CRC Type may not be a parameter explicitly contained within the MIB. Rather, the 16-bit CRC type may be added afterwards, so it may be more properly regarded as a PBCH parameter.

The current 3GPP LTE standard, for example in TS 36.331 Section 8.4, defines that the 10 spare bits of the MIB be set to zero. Therefore, in some embodiments, the template symbol sequences may be generated, for example by the decoder, such that they represent symbol sequences having an MIB with all of its spare bits set to zero. Symbol sequences representative of an MIB with one or more nonzero spare bits may be refrained from being generated, or alternatively discarded and/or filtered out, so that they are not subjected to correlation decoding, thereby conserving computational effort. Alternatively, template symbol sequences representative of an MIB with all zero spare bits may be subjected to correlation operations first and, if no sufficiently high correlation is found, other template symbol sequences, each with at least one non-zero spare bit, may be subjected to correlation operations.

In some embodiments, if the LTE standard changes so as to define some new usage for these 10 spare bits of the MIB, generation of the template symbol sequences may be adjusted. Embodiments of the present invention may therefore be configured to facilitate generation of template symbol sequences which are representative of nonzero spare bits in the MIB, as well as correlation and evaluation of these generated template symbol sequences. An exemplary method to support this forward compatibility is to have the decoder be capable to store and enable alternate possibilities, beyond all zeros, for these spare bits. In some embodiments, these alternate spare bit pattern possibilities may be programmed over the air into the UE's decoder before the eNB starts to transmit MIBs having the corresponding spare bit pattern on the PBCH. After the programming of the alternate spare bit patterns, the decoder may be configured to thereafter generate new template symbol sequences using these alternate spare bits.

In some embodiments, a single predetermined value for the MIB spare bits may be used to generate some or all template symbol sequences. In some embodiments, plural predetermined values for the MIB spare bits may be used to generate some or all template symbol sequences. In some embodiments, a bit mask may be used in the generation of template symbol sequences, such that some predetermined spare bits of the MIB correspond to a predetermined value. For example, if it is desired only to evaluate template symbol sequences representative of MIB spare bits of the form 1100XX00X1, then template symbol sequences may be generated which represent up to eight different values for the MIB spare bits, by replacing each of the various 'X' values above with either '0' or '1'. That is, in various embodiments, to facilitate forward compatibility, the correlation decoder may allow for the possibility that the MIB spare bits are not always zeros.

In various embodiments, bits other than the spare MIB bits may be treated in a similar manner. That is, if it is known that certain data to be transmitted via the PBCH is likely to correspond to a predetermined bit pattern, the template symbol sequences may be generated so that they reflect this predetermined bit pattern. Template symbol sequences representative of more likely bit patterns may be evaluated first.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, mobile or handheld wireless device, M2M device, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for decoding transmissions over a physical broadcast channel (PBCH) by a user equipment (UE), said transmissions made by a base station, wherein the PBCH provides timing information and configuration information for supporting communication, the method comprising:
   providing at least one template symbol sequence representative of a potential transmission by the base station over the PBCH;
   receiving one or more signals transmitted over the PBCH by the base station, the one or more signals indicative of a received symbol sequence;

processing the one or more signals to extract the received symbol sequence;

performing correlation operations between the at least one template symbol sequence and the received symbol sequence; and selecting a representative symbol sequence, timing parameter, or both, based on the correlation operations, said representative symbol sequence indicative of information transmitted by the base station over the PBCH, wherein each of the correlation operations comprises multiplying one of the at least one template symbol sequences with the received symbol sequence for a plurality of different time shifts.

2. The method according to claim 1, further comprising: providing information related to data potentially encoded into the potential transmission, wherein the at least one template symbol sequence is generated based at least in part on said provided information.

3. The method according to claim 2, wherein said provided information is determined based on anticipated contents of a Master Information Block (MIB) transmitted by the base station and received by the UE.

4. The method according to claim 3, further comprising constraining, by the base station, contents of the transmitted MIB, thereby improving predictability of said contents, improving correlation properties of the MIB, or both.

5. The method according to claim 2, wherein said anticipated contents of the MIB are based on contents of a received SIB1 system information block.

6. The method according to claim 2, wherein the provided information is stored information.

7. The method according to claim 2, wherein the provided information is obtained by processing signals received from the base station.

8. The method according to claim 7, wherein the provided information comprises one or more of: an RF bandwidth, data obtained from decoding SIB1, and reference symbols indicative of antenna configuration.

9. The method according to claim 1, wherein the at least one template symbol sequence comprises two or more template symbol sequences, and wherein the correlation operations comprises correlating the two or more template symbol sequences against the received symbol sequence.

10. The method according to claim 1, further comprising selecting a portion of the template symbol sequence, and wherein the correlation operation comprises correlating the selected portion of the template symbol sequence against at least a corresponding portion of the received symbol sequence, wherein the selected portion is a strict contiguous or non-contiguous subset of the template symbol sequence.

11. The method according to claim 1, wherein the correlation operations are performed in support of an adaptive search for the representative symbol sequence, timing parameter, or both based on the at least one template symbol sequence, wherein the adaptive search comprises one or more of: a depth-first search, a breadth-first search, and a best-first search.

12. The method according to claim 1, wherein the representative symbol sequence is selected as one of said at least one template symbol sequences which correlates most strongly with the received symbol sequence.

13. The method according to claim 1, wherein said timing parameter provides an indication of timing in a wireless communication system between the UE and the base station, and wherein further decoding of received data is performed making use of said system timing.

14. A method for decoding transmissions over a physical broadcast channel (PBCH) by a user equipment (UE), said transmissions made by a base station, wherein the PBCH provides timing information and configuration information for supporting communication, the method comprising:

providing at least one template symbol sequence representative of a potential transmission by the base station over the PBCH;

receiving one or more signals transmitted over the PBCH by the base station, the one or more signals indicative of a received symbol sequence;

processing the one or more signals to extract the received symbol sequence;

performing correlation operations between the at least one template symbol sequence and the received symbol sequence; and selecting a representative symbol sequence, timing parameter, or both, based on the correlation operations, said representative symbol sequence indicative of information transmitted by the base station over the PBCH, wherein the correlation operations comprise a first round of correlation operations and a second round of correlation operations subsequent to the first round, wherein correlation operations during the first round are applied to smaller portions of the at least one template symbol sequence than correlation operations during the second round, and wherein fewer correlation operations are applied during the second round than during the first round, said fewer correlation operations selected based on an outcome of the first round.

15. A method for decoding transmissions over a physical broadcast channel (PBCH) by a user equipment (UE), said transmissions made by a base station, wherein the PBCH provides timing information and configuration information for supporting communication, the method comprising:

providing at least one template symbol sequence representative of a potential transmission by the base station over the PBCH;

receiving one or more signals transmitted over the PBCH by the base station, the one or more signals indicative of a received symbol sequence;

processing the one or more signals to extract the received symbol sequence;

performing correlation operations between the at least one template symbol sequence and the received symbol sequence; and selecting a representative symbol sequence, timing parameter, or both, based on the correlation operations, said representative symbol sequence indicative of information transmitted by the base station over the PBCH, wherein performing the correlation operations comprises applying a plurality of time shifts to at least one of the template symbol sequences, and wherein the timing parameter corresponds to one of said plurality of time shifts which results in a strongest element of a correlation function between one of said at least one of the template symbol sequences and the received symbol sequence.

16. A user equipment (UE) apparatus for decoding transmissions over a physical broadcast channel (PBCH), said transmissions made by a base station, wherein the PBCH provides timing information and configuration information for supporting communication, the apparatus comprising:

a template module configured to provide at least one template symbol sequence representative of a potential transmission by the base station over the PBCH;

a receiver module configured to receive one or more signals transmitted over the PBCH by the base station, the one or more signals indicative of a received symbol sequence, the receiver module further configured to process the one or more signals to extract the received symbol sequence;

a correlation module configured to perform correlation operations between the at least one template symbol sequence and the received symbol sequence; and an evaluation module configured to select a representative symbol sequence, timing parameter, or both, based on the correlation operations, said representative symbol sequence indicative of information transmitted by the base station over the PBCH, wherein the correlation module is configured to correlate the at least one template symbol sequence against the received symbol sequence using a plurality of different time shifts.

17. The apparatus according to claim 16, wherein the template module is further configured to provide information related to data potentially encoded into the potential transmission, and to generate each of the at least one template symbol sequences based at least in part on said provided information.

18. The apparatus according to claim 17, wherein the provided information is stored information.

19. The apparatus according to claim 17, wherein the provided information is obtained by processing signals received from the base station.

20. The apparatus according to claim 19, wherein the provided information comprises one or more of: an RF bandwidth, data obtained from decoding SIB1, and reference symbols indicative of antenna configuration.

21. The apparatus according to claim 16, wherein the at least one template symbol sequence comprises two or more template symbol sequences, and wherein the correlation module is configured to correlate the two or more template symbol sequences against the received symbol sequence.

22. The apparatus according to claim 16, wherein the correlation module is further configured to select a portion of the template symbol sequence, and wherein the correlation operation comprises correlating the selected portion of the template symbol sequence against at least a corresponding portion of the received symbol sequence, wherein the selected portion is a strict contiguous or non-contiguous subset of the template symbol sequence.

23. The apparatus according to claim 16, wherein the correlation operations are performed in support of an adaptive search for the representative symbol sequence, timing parameter, or both based on the at least one template symbol sequence, wherein the adaptive search comprises one or more of: a depth-first search, a breadth-first search, and a best-first search.

24. The apparatus according to claim 16, wherein the correlation module comprises a FFT/IFFT hardware accelerator block which is also used for one or more other signal processing operations of the apparatus.

25. A user equipment (UE) apparatus for decoding transmissions over a physical broadcast channel (PBCH), said transmissions made by a base station, wherein the PBCH provides timing information and configuration information for supporting communication, the apparatus comprising:

a template module configured to provide at least one template symbol sequence representative of a potential transmission by the base station over the PBCH;

a receiver module configured to receive one or more signals transmitted over the PBCH by the base station, the one or more signals indicative of a received symbol sequence, the receiver module further configured to process the one or more signals to extract the received symbol sequence;

a correlation module configured to perform correlation operations between the at least one template symbol sequence and the received symbol sequence; and an evaluation module configured to select a representative symbol sequence, timing parameter, or both, based on the correlation operations, said representative symbol sequence indicative of information transmitted by the base station over the PBCH, wherein the correlation module is configured to perform a first round of correlation operations and a second round of correlation operations subsequent to the first round, wherein correlation operations during the first round are applied to smaller portions of the at least one template symbol sequence than correlation operations during the second round, and wherein fewer correlation operations are applied during the second round than during the first round, said fewer correlation operations selected based on an outcome of the first round.

26. A computer program product comprising a non-transitory computer readable medium storing computer executable statements and instructions thereon that, when executed by a computer, perform operations for decoding transmissions over a physical broadcast channel (PBCH) by a user equipment (UE), said transmissions made by a base station, wherein the PBCH provides timing information and configuration information for supporting communication, the operations comprising:

providing at least one template symbol sequence representative of a potential transmission by the base station over the PBCH;

receiving one or more signals transmitted over the PBCH by the base station, the one or more signals indicative of a received symbol sequence;

processing the one or more signals to extract the received symbol sequence;

performing correlation operations between the at least one template symbol sequence and the received symbol sequence; and selecting a representative symbol sequence, timing parameter, or both, based on the correlation operations, said representative symbol sequence indicative of information transmitted by the base station over the PBCH, wherein each of the correlation operations comprises multiplying one of the at least one template symbol sequences with the received symbol sequence for a plurality of different time shifts.

27. A user equipment (UE) apparatus for decoding transmissions over a physical broadcast channel (PBCH), said transmissions made by a base station, wherein the PBCH provides timing information and configuration information for supporting communication, the apparatus comprising:

a template module configured to provide at least one template symbol sequence representative of a potential transmission by the base station over the PBCH;

a receiver module configured to receive one or more signals transmitted over the PBCH by the base station, the one or more signals indicative of a received symbol sequence, the receiver module further configured to process the one or more signals to extract the received symbol sequence;

a correlation module configured to perform correlation operations between the at least one template symbol sequence and the received symbol sequence; and an evaluation module configured to select a representative symbol sequence, timing parameter, or both, based on the correlation operations, said representative symbol sequence indicative of information transmitted by the base station over the PBCH,
wherein the correlation module is configured to perform the correlation operations by applying a plurality of time shifts to at least one of the template symbol sequences, and wherein the timing parameter corresponds to one of said plurality of time shifts which results in a strongest element of a correlation function between one of said at least one of the template symbol sequences and the received symbol sequence.

* * * * *